Figure 1:
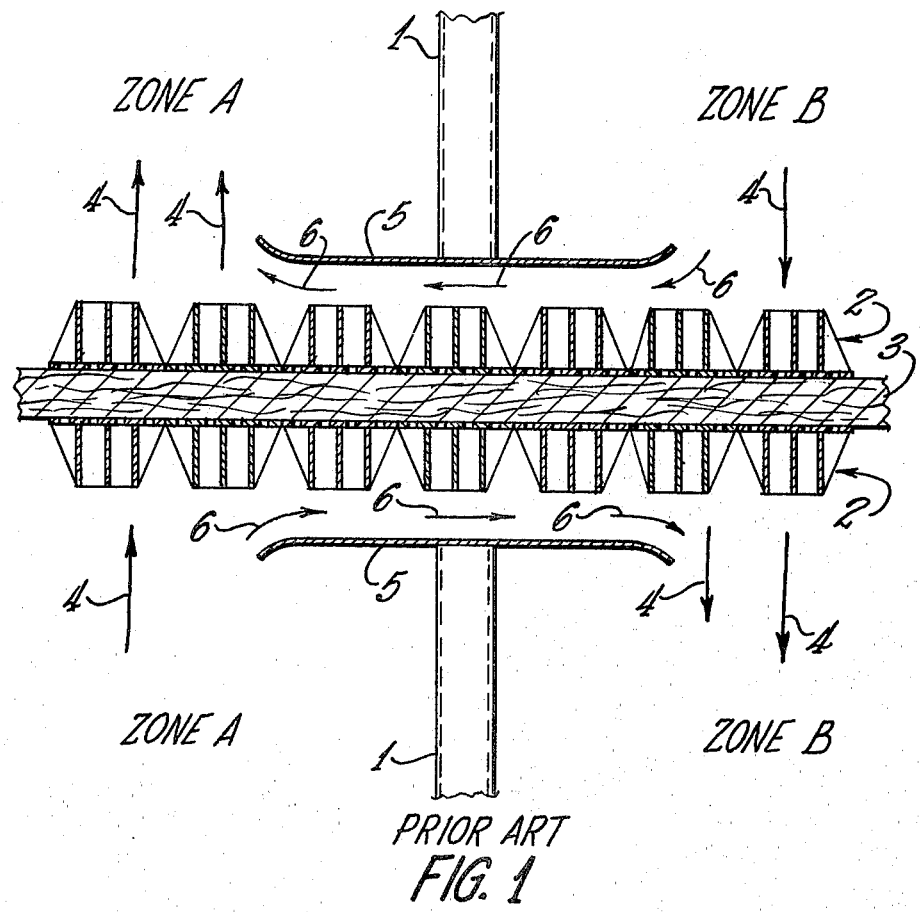

United States Patent [19]

McCort

[11] 4,192,516
[45] Mar. 11, 1980

[54] SEALS FOR OVENS

[75] Inventor: Ralph E. McCort, Newark, Ohio

[73] Assignee: Owens-Corning Fiberglas Corporation, Toledo, Ohio

[21] Appl. No.: 973,467

[22] Filed: Dec. 26, 1978

[51] Int. Cl.² .................. F26B 11/02; F16J 15/44
[52] U.S. Cl. ........................................ 277/12; 277/53;
277/DIG. 7; 198/861; 34/207; 34/242;
432/140; 432/242
[58] Field of Search ............ 277/12, DIG. 7, DIG. 1,
277/53, 55, 237 R; 198/860, 861; 34/207, 242;
432/140, 242

[56] References Cited

U.S. PATENT DOCUMENTS

| 885,032 | 4/1908 | DeFerranti | 277/53 X |
|---|---|---|---|
| 3,013,824 | 12/1961 | Wilson | 277/53 |
| 3,090,134 | 5/1963 | Morrison | 34/242 |
| 3,302,423 | 2/1967 | Morrison | 34/242 X |
| 3,744,145 | 7/1973 | Maxwell et al. | 432/140 X |
| 3,849,907 | 11/1974 | Lynch | 34/242 |
| 3,875,686 | 4/1975 | Smoot | 34/242 |
| 3,913,241 | 10/1975 | Chaikin et al. | 34/242 X |
| 3,917,150 | 11/1975 | Ferguson et al. | 277/53 X |
| 3,932,947 | 1/1976 | Smoot | 34/242 |
| 4,043,157 | 8/1977 | Schiffer | 34/242 X |

FOREIGN PATENT DOCUMENTS

| 970408 | 7/1975 | Canada | 277/53 |
|---|---|---|---|
| 327486 | 4/1930 | United Kingdom | 432/140 |
| 469310 | 7/1937 | United Kingdom | 34/242 |
| 1417969 | 12/1975 | United Kingdom | 277/53 |

*Primary Examiner*—Robert S. Ward, Jr.
*Attorney, Agent, or Firm*—Ronald C. Hudgens; Philip R. Cloutier; Ted C. Gillespie

[57] ABSTRACT

In ovens which are divided by baffles to form zones, and through which conveyor belts pass, seals are positioned to prevent the flow of gases between zones. The seals are positioned between the baffle and the belt, and comprise a plurality of brushes extending from the baffle across the width of the belt and positioned so that at all times at least one of the brushes is in contact relationship with a non-foraminous portion of the belt.

12 Claims, 4 Drawing Figures

SEALS FOR OVENS

This invention relates to apparatus for preventing gaseous flow between the zones of a multi-zoned oven. More particularly, this invention relates to seals positioned between oven baffles and belts, such as conveyor belts, where baffles are used to divide the oven into zones, and the belt travels through the zones and the seal prevents the flow of gases from one zone to another around the baffle. In one of its more specific aspects, this invention relates to the seal between the baffles and the foraminous oven flights of a conveyor belt passing through an oven for curing fibrous mineral insulation products, such as fiber glass insulation.

It is common practice in the manufacture of mineral fiber insulation to pass the insulation between a pair of foraminous conveyors, or belts, mounted for travel through the curing oven. Hot gases are passed through the insulation to more effectively cure the binder in the insulation. Generally, insulation curing ovens are divided into zones by a plurality of baffles. Associated with the oven zones are fans which create drafts of hot curing air which travel generally upward or downward in each zone. Seals between the oven walls and the sides of the conveyors direct the flow of curing air so that its only path is through the foraminous chain and the insulation pack. Typically, various combinations of updraft zones and downdraft zones are utilized in order to evaporate moisture contained in the insulation pack and to cure the resinous binder coating the fibers within the pack. A common problem in such an oven is the leakage between two zones at the intersections of the foraminous belt and the ovens.

Attempts to solve this curing gases leakage problem have been made in the past. One solution involved the attachment of a flexible seal to the baffle at the junction of the baffle and the belt. This attempted solution was unsatisfactory because the structural body of the chain flights of the belt prevented close contact between the flexible seals and the foraminous insulation-contacting portion of the belt flights.

Another attempted solution was the installation of a thin sheet metal plate attached to the baffle at the junction of the baffle and the belt. The sheet metal plate lay horizontally, in parallel with the belt, and was upraised at the leading edge to prevent bumping from misaligned belt flights. This design required that the plate be positioned very close to the flights to prevent air flow between zones, and this positioning resulted in misaligned flights striking the plate, thereby distorting the plate and rendering it inoperable.

There has now been developed a seal between the conveyor belts and baffles in a zonal oven in which a plurality of flexible members, or brushes, extend from the baffle to the flights of the foraminous conveyor, and in contact relationship with the flights, which is defined as contact between the brushes and a non-foraminous portion of the belt in such a manner as to prevent the flow of air between zones around the baffle. The brushes are positioned so that at all times at least one of the brushes is touching a non-foraminous portion of the belt to prevent the lateral flow of air from zone to zone around the baffle. The brushes can be mounted in contact relationship with the baffle by a mounting means or brush holder which extends across the width of the conveyor.

According to this invention, there is provided apparatus comprising an oven, a baffle positioned within the oven to divide the oven into at least two zones, a first belt mounted for travel through at least two of the zones, the belt having foraminous and non-foraminous portions, and a plurality of members extending from the baffle across the width of the first belt, the members being positioned so that at all times one of the members is in a contact relationship with a non-foraminous portion of the first belt. The apparatus can include means extending across the width of the first belt for mounting the members in contact relationship with the baffle. The members extending from the baffle can be flexible, can be brushes, and can be mounted generally parallel to each other and generally perpendicular to the first belt. There can be means provided for inducing a first flow of gases in at least one of the zones through the first foraminous belt. There can also be means provided for inducing a second flow of gases through the first foraminous belt in another of the zones, where the second flow of gases is in a direction opposite from the first flow of gases. A second belt can be mounted for travel through the oven generally parallel with the first belt, and either of the belts, or both, can be continuous and mounted for travel entirely within the oven.

Figure 2:
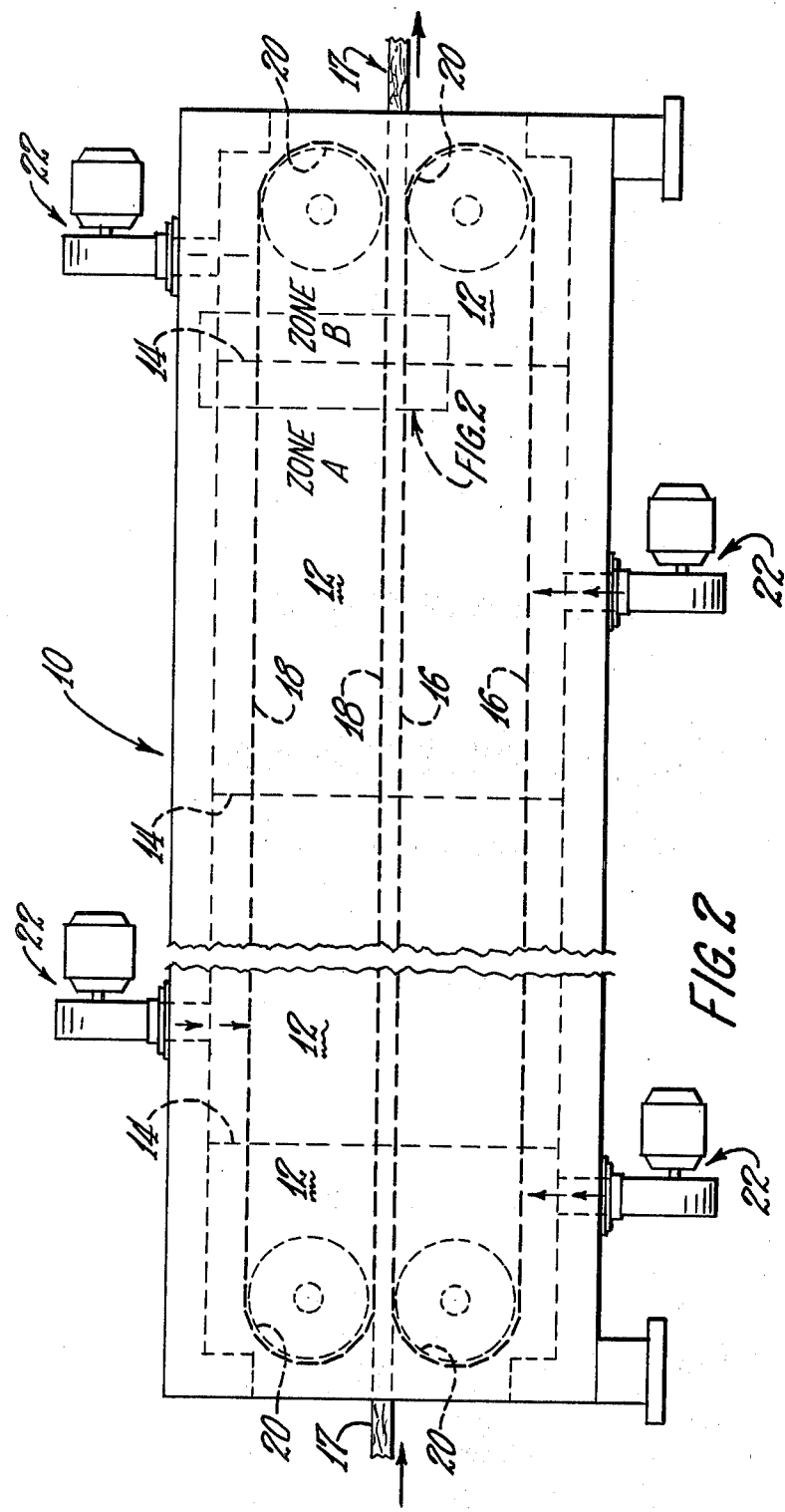
Figure 3:
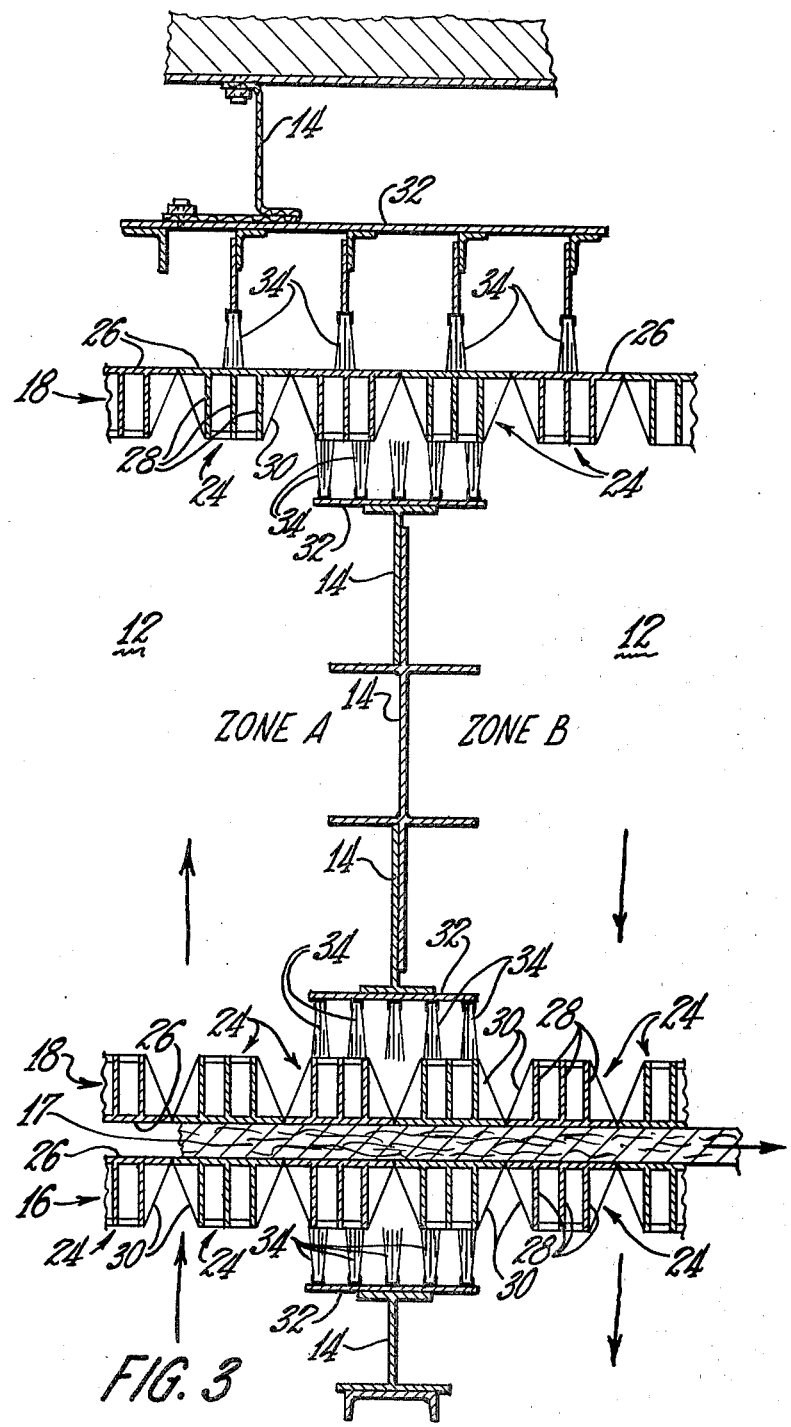
Figure 4:
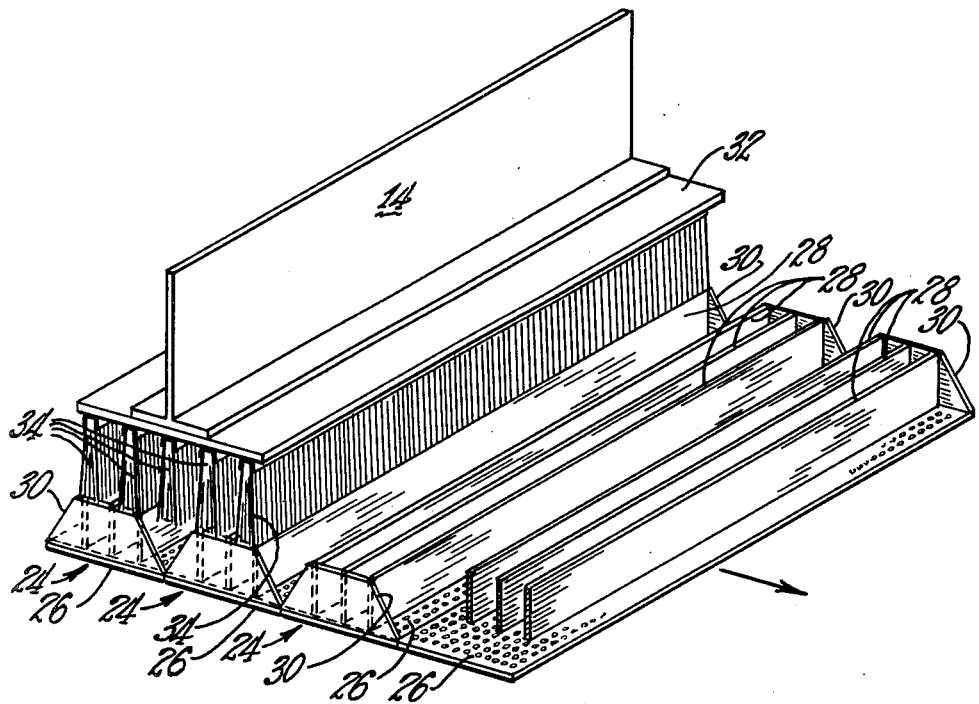

This invention will be more fully understood by referring to the drawings in which FIG. 1 is a schematic diagram of an oven seal of the prior art, FIG. 2 is a schematic elevation view of an oven according to the principles of this invention, FIG. 3 is an elevation section taken at the interface of two zones, zone A and zone B of FIG. 1, and FIG. 4 is a schematic view of the invention with an oven flight.

Referring to FIG. 1, it can be seen that zone A and zone B are separated by baffle 1. Passing through the two zones are two foraminous belts 2 between which insulation pack 3 is carried. Fans, not shown, provide an updraft in zone A and a downdraft in zone B, as indicated by arrows 4. Plates 5 mounted on the ends of the baffles are designed to prevent the flow of air from one zone to the other. As shown by small arrows 6 some of the air flows from one zone to another.

Referring to FIGS. 2 and 3, there is shown oven 10 which is divided into a plurality of zones 12 by one or more baffles 14. The baffles can be of generally conventional type and are designed to substantially prevent flows of gases from one zone to another. First belt 16 is mounted for travel through at least two of the zones. The first belt is adapted to carry insulation pack 17 through each zone of the oven. Second foraminous belt 18 can also be mounted for travel through the oven in a generally parallel relationship to the first belt so that the insulation will be positioned between the two belts during travel through the oven. The belts can be mounted for travel through the oven on conventional wheels 20, and one or both of the belts can be mounted for travel entirely within the oven. Associated with each zone in the oven can be a fan, such as fans 22. Each fan can be adapted to induce a flow of hot gases either upwardly or downwardly through its associated zone, the hot gases thereby being forced through the belts and through the insulation pack which is traveling between the belts. The fans can be adapted to produce flows of hot gases in directions other than upward and downward. The fans can be adapted so that the flow of induced air in one zone is in the opposite direction from the flow of air induced by the fan for an adjacent zone. For example, the fan associated with zone B can be an exhaust fan which induces a flow of air downwardly through zone B and downwardly through the insulation pack whereas, at the same time, the fan associated with the zone A can be an air supply fan which induces an upward flow of air through zone A and through the insulation pack.

As shown in FIGS. 3 and 4, the belts can be comprised of flights 24, whose structure is comprised of foraminous portions or perforated plates 26 which contact the insulation pack, non-foraminous portions or solid plates 28, which are impervious to the flow of air adjacent the perforated plate in a direction parallel to the perforated plates, and structural framework 30 which ties together and supports the flights. In the preferred embodiment the solid plates are vertical.

Extending from the baffle toward the flights and into a contact relationship with the flights, is a plurality of members 34 which can be brushes. The brushes can be flexible and, in the preferred embodiments, the brushes are generally parallel to each other and perpendicular to the belts. The brushes extend across the width of the belt in contact relationship with the belt to prevent the flow of gases around the baffle. In a preferred embodiment, the brushes are comprised of stainless steel bristles each having a diameter within the range of from about ten thousandths to about fourteen thousandths inch. In its most preferred embodiment, the invention comprises bristles having a diameter of twelve thousandths inch.

Extending across the width of the belt can be means 32, hereinafter referred to as a brush holder, for mounting the brushes in a contact relationship with the baffle. The brush holder can comprise a flat rectangular plate lying in a plane substantially parallel to the belt. The brush holder can be a solid plate to prevent the flow of gases therethrough.

The brushes are mounted so that they make contact with the solid plates of the flights, as the flights travel past the brushes. Contact between the brushes and the solid plates is such that a flow of air or other gases is prevented from traveling from one zone to another around the baffle. This requires that the brushes be positioned so that there is always contact between at least one of the brushes and at least one of the solid plates, since it is the contact relationship between the brushes and the solid plates which prevents air flow around the baffle.

It is to be understood that the seal of the present invention can be placed at every position in the oven that the baffles are intersected by the path of the belts.

Various modifications of the above described embodiments of the invention will be apparent to those skilled in the art, and it is to be understood that such modifications can be made without departing from the scope of the invention.

I claim:

1. Apparatus comprising:
    a. an oven;
    b. a baffle positioned within said oven to divide said oven into zones;
    c. a first belt mounted for travel through at least two of said zones, said belt having foraminous and non-foraminous portions; and,
    d. a plurality of members extending from said baffle across the width of said first belt, said members being positioned so that at all times at least one of said members is in a contact relationship with a non-foraminous portion of said belt.

2. The apparatus of claim 1 in which said members extending from said baffle are flexible members.

3. The apparatus of claim 2 comprising means extending across the width of said first foraminous belt for mounting said members in contact relationship with said baffle.

4. The apparatus of claim 3 in which said flexible members are generally parallel to each other, and are generally perpendicular to said first belt.

5. The apparatus of claim 4 in which the mounting means comprises a flat rectangular member positioned in a plane which is generally parallel to said first belt.

6. The apparatus of claim 5 in which said flexible members comprise brushes.

7. The apparatus of claim 6 comprising means for inducing a first flow of gases through said first belt in at least one of said zones.

8. The apparatus claim 7 comprising means for inducing a second flow of gases through said first belt in another of said zones, said second flow of gases being in a direction opposite said first flow of gases.

9. The apparatus of claim 3 comprising a second belt mounted for travel through said oven in a generally parallel relationship with said first belt.

10. The apparatus of claim 9 in which either said first belt or said second belt is continuous, and is mounted for travel entirely within said oven.

11. The apparatus of claim 6 in which said brushes comprise stainless steel bristles.

12. The apparatus of claim 11 in which the diameter of said bristles is within the range of from about ten to about fourteen thousandths inch.

* * * * *